(12) United States Patent
Bentham et al.

(10) Patent No.: US 7,455,567 B2
(45) Date of Patent: Nov. 25, 2008

(54) GARMENTS HAVING AUXETIC FOAM LAYERS

(75) Inventors: Martin Bentham, Barnsley (GB); Andrew Alderson, Liverpool (GB); Kim Leslie Alderson, Liverpool (GB)

(73) Assignee: Hanesbrands Inc., Winston-Salem, NC (US)

( * ) Notice: Subject to any disclaimer, the term of this patent is extended or adjusted under 35 U.S.C. 154(b) by 0 days.

(21) Appl. No.: 11/498,032

(22) Filed: Aug. 2, 2006

(65) Prior Publication Data

US 2008/0032598 A1 Feb. 7, 2008

(51) Int. Cl.
*A41C 3/12* (2006.01)
*A41C 3/10* (2006.01)
(52) U.S. Cl. ............................. 450/57; 450/58; 450/54
(58) Field of Classification Search ............... 450/39, 450/92, 93, 54–58; 2/455, 463; 264/125, 264/126, 127, 109; 428/412, 36.1, 299.7; 293/122, 120
See application file for complete search history.

(56) References Cited

U.S. PATENT DOCUMENTS

| | | | |
|---|---|---|---|
| 4,187,390 A | 2/1980 | Gore | |
| 4,668,557 A * | 5/1987 | Lakes | 428/131 |
| 5,035,713 A | 7/1991 | Friis | |
| 5,273,698 A | 12/1993 | Thary | |
| 5,296,182 A | 3/1994 | Thary | |
| 5,389,318 A | 2/1995 | Thary | |
| 5,641,564 A | 6/1997 | Thary | |
| 5,971,730 A | 10/1999 | Thary | |
| 6,042,608 A * | 3/2000 | Ishikawa et al. | 623/7 |
| 6,083,080 A * | 7/2000 | Lawson et al. | 450/39 |
| 6,090,038 A | 7/2000 | Zunker et al. | |
| 6,090,098 A | 7/2000 | Zunker et al. | |
| 6,142,928 A | 11/2000 | Zunker et al. | |
| 6,171,338 B1 | 1/2001 | Talja et al. | |
| 6,412,593 B1 | 7/2002 | Jones | |
| 6,428,506 B1 | 8/2002 | Simhambhatla et al. | |
| 6,558,370 B2 | 5/2003 | Moser | |
| 6,602,224 B1 | 8/2003 | Simhambhatla | |
| 6,676,594 B1 | 1/2004 | Zunker et al. | |
| 6,743,388 B2 | 6/2004 | Sridharan et al. | |
| 6,770,025 B2 | 8/2004 | Zunker | |
| 6,780,361 B1 | 8/2004 | Sridharan et al. | |
| 6,808,485 B2 | 10/2004 | Zunker | |
| 6,837,890 B1 | 1/2005 | Chludzinski et al. | |
| 6,878,320 B1 * | 4/2005 | Alderson et al. | 264/125 |
| 6,890,395 B2 | 5/2005 | Simhambhatla | |
| 7,160,621 B2 * | 1/2007 | Chaudhari et al. | 428/412 |
| 7,247,265 B2 * | 7/2007 | Alderson et al. | 264/125 |
| 2004/0186588 A1 | 9/2004 | Sridharan et al. | |
| 2005/0003011 A1 | 1/2005 | Sridharan et al. | |
| 2005/0159066 A1 | 7/2005 | Alderson et al. | |

FOREIGN PATENT DOCUMENTS

| | | |
|---|---|---|
| EP | 0253513 | 8/1992 |
| WO | WO 91/01210 | 7/1991 |

* cited by examiner

*Primary Examiner*—Gloria Hale
(74) *Attorney, Agent, or Firm*—Womble Carlyle Sandridge & Rice, PLLC

(57) ABSTRACT

A garment is provided that has a support region and a foam pad at the region. The foam pads has at least one auxetic foam layer. A garment is also provided that includes at least one auxetic foam layer.

26 Claims, 2 Drawing Sheets

After stretching along y

Before stretching along y

GARMENTS HAVING AUXETIC FOAM LAYERS

BACKGROUND OF THE INVENTION

1. Field of the Invention

The present disclosure is related to garments. More particularly, the present disclosure is related to garments having at least one auxetic foam layer.

2. Description of Related Art

Many garments such as, but not limited to, intimate apparel garments including brassieres, camisoles, bathing suits, pantyhose, leotards, and others are known. Many garments include one or more support and/or shaping regions ("support regions"). For example, brassieres typically include a pair of breast cups for supporting and/or shaping the breasts of the wearer. Some prior art breast cups included a molded foam member that is sewn or otherwise secured to the brassiere in the area of the breast cups.

Unfortunately, typical molded foam members in the breast cups have not proven effective for use as sports brassieres. Namely, such molded foam members alone do not provide sufficient support of the breasts when exposed to the conditions present during running, jogging, jumping, and other sports related movements. Thus, typical sports brassieres use high elastic knit structures, in lieu of or in addition to the molded foam members, to provide sufficient support, which can lead to discomfort during use.

Moreover, brassieres having typical molded foam members in the breast cups can provide limited support to the user during stretching movements common in everyday life.

Accordingly, there is a continuing need for garments that overcome, alleviate, and/or mitigate one or more of the above deleterious effects of the prior art.

BRIEF SUMMARY OF THE INVENTION

It is an object of the present disclosure to provide a garment having one or more auxetic foam layers.

These and other objects and advantages of the present disclosure are provided by a garment that has a support region and a foam pad at the support region.

The above-described and other features and advantages of the present disclosure will be appreciated and understood by those skilled in the art from the following detailed description, drawings, and appended claims.

DETAILED DESCRIPTION OF THE INVENTION

Figure 1:
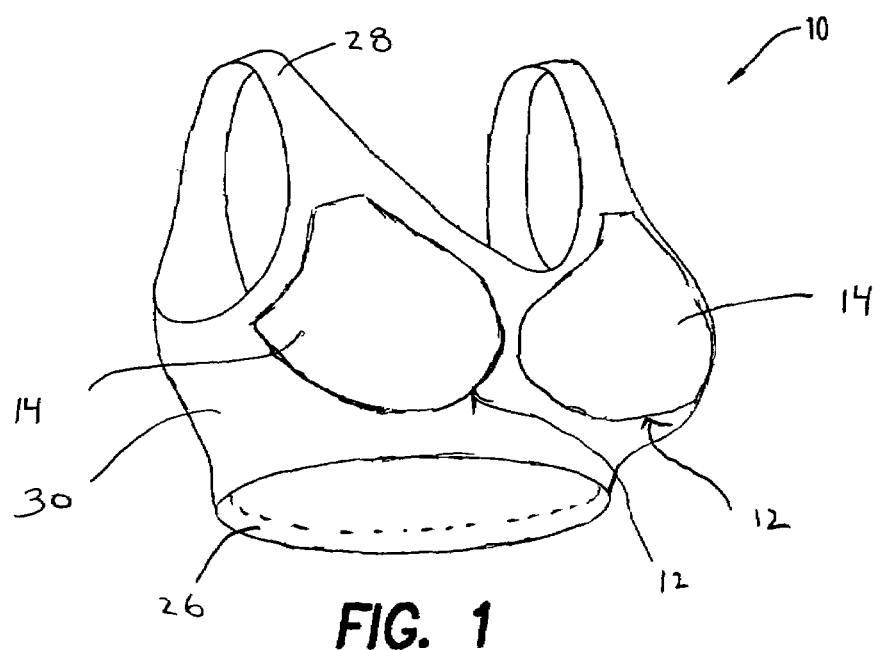
FIG. 1 is a front perspective view of an exemplary embodiment of a garment having a foam pad according to the present disclosure.
Figure 2:
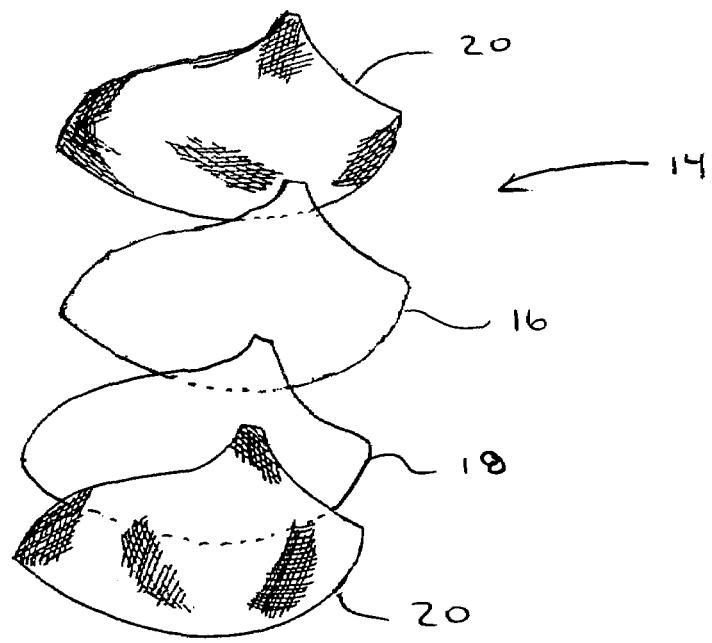
FIG. 2 is an exploded view of the foam pad of FIG. 1.

Referring now to the figures and in particular to FIGS. 1 and 2, an exemplary embodiment of an intimate apparel garment according to the present disclosure is generally illustrated by reference numeral 10. Garment 10 includes one or more support regions 12 (two shown) each having a foam pad 14 secured thereto. For purposes of clarity, garment 10 is illustrated as a brassiere and support region 12 is illustrated as breast cup regions of the brassiere.

Foam pad 14 can be secured to garment 10 in any known manner. For example, foam pad 14 can be secured to garment 10 by a seam, an adhesive, and combinations thereof. In exemplary embodiments, the seam can be a sewn seam and/or a welded seam.

Advantageously, foam pad 14 includes at least one auxetic foam layer 16 (only one shown). In one embodiment, foam pad 14 can also include one or more conventional or non-auxetic foam layers 18 (only one shown). Auxetic foam layer 16 and/or conventional foam layers 18 can be open-cell foam or closed-cell foam. Auxetic foam layer 16 can be a polymer auxetic foam layer, a metallic auxetic foam layer, or any combinations thereof.

As used herein, the term "auxetic foam" means a foam structure that exhibits a negative Poisson's ratio. Specifically, auxetic foam layer as used herein is a foam layer that expands in one or more directions when placed under tension. Thus, auxetic foam can become fatter in one or more directions when stretched.

Such auxetic behavior is in contrast to ordinary or conventional foam layers that become substantially thinner when stretched. Thus, traditional or prior art foam pads having only conventional foam layers get smaller during body movements, which is a time when the body needs additional support. Advantageously, it has been determined that garment 10 having foam pad 14 including at least one auxetic foam layer 16 provides support and shaping during times that the foam pad is placed in tension, such as when the wearer is stretching.

Further, auxetic foams, much like typical foams, contract in one or more directions when placed under compression so that the foam becomes thinner in one or more directions when compressed.

Foam pad 14 can also include one or more fabric layers 20 covering auxetic foam layer 16 and, when present, conventional foam layer 18. For example, foam pad 14 can include a fabric layer 20 on one or both sides of auxetic foam layer 16, when only auxetic foam layer 16 is present. Additionally, foam pad 14 can include a fabric layer 20 on one side of auxetic foam layer 16 and/or conventional foam layer 18, when the conventional foam layer is present.

For purposes of clarity, foam pad 14 is illustrated having one auxetic foam layer 16 adjacent one conventional foam layer 18, the composite of which is sandwiched between two fabric layers 20. Of course, it is contemplated by the present disclosure for foam pad 14 to include a plurality of auxetic foam layers 16, a plurality of conventional foam layers 18, a plurality of fabric layers 20 on one or more sides of the foam pads, or any combinations thereof. It is contemplated by the present disclosure for fabric layer 20 to be part of garment 10, for example foam pad 14 can be sewn or otherwise joined directly to garment 10.

Figure 4:
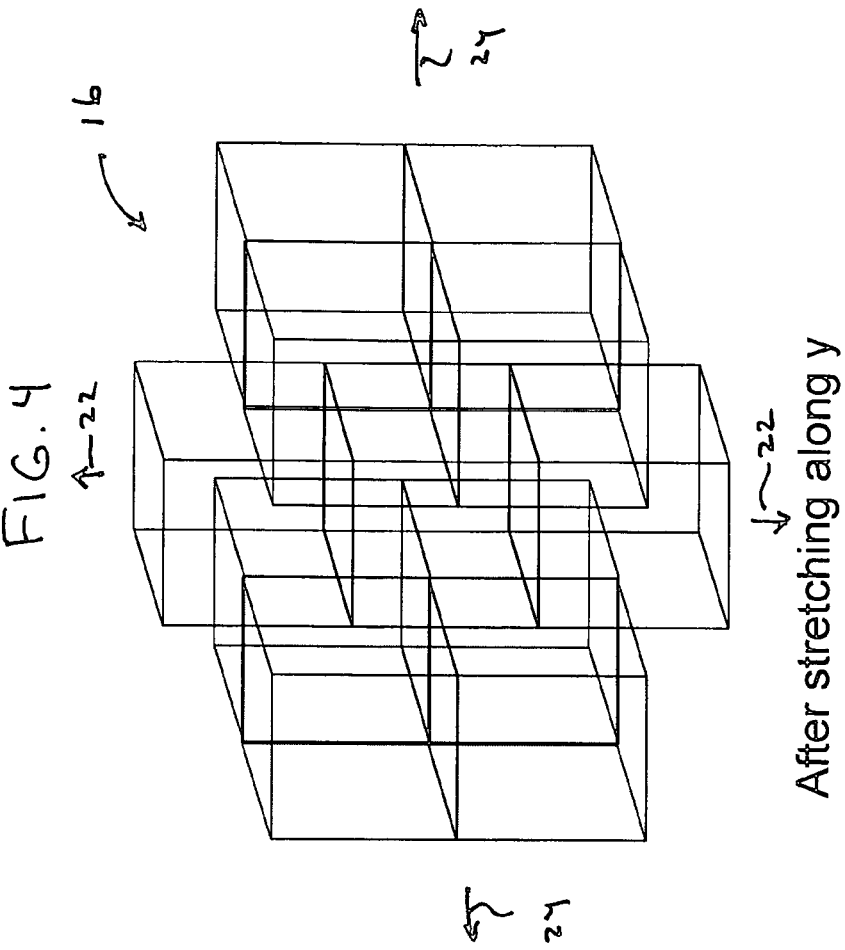
FIG. 4 illustrates a schematic view of the polymer structure of FIG. 3 when placed in tension.
Figure 3:
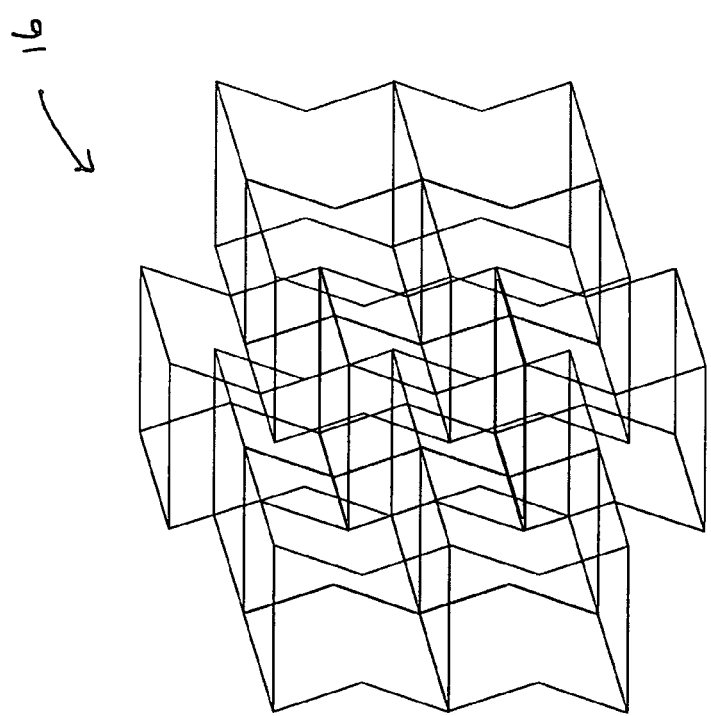
FIG. 3 illustrates a schematic view of a structure of an auxetic foam layer of the foam pad of FIG. 2 when unstressed.

Referring now to FIGS. 3 and 4, an exemplary embodiment of a structure of auxetic foam layer 16 is shown schematically. Auxetic foam layer 16 includes a structure that unfolds or opens when placed under tension. In the illustrated embodiment, auxetic foam layer 16 is a bi-directional polymer structure that unfolds or opens when subjected to tension in a first direction 22 and/or a second direction 24.

Of course, it is contemplated for auxetic foam layer 16 to have any desired structure sufficient for the layer to open or unfold in at least one direction (e.g., unidirectional), in a number of directions (multi-directional), or all directions (e.g., omni-directional).

In addition, it is also contemplated for foam pad 14 to include a plurality of unidirectional auxetic foam layers 16, where the unidirectional auxetic foam layers are oriented with respect to one another so that the resultant foam pad can open or unfold in as many directions as desired.

Auxetic foam layer 16 can have a negative through-thickness Poisson's ratio and/or a negative in-plane Poisson's ratio.

A negative through-thickness Poisson's ratio leads to thickening of the foam when stretched. In embodiments where foam pad 14 includes both auxetic and conventional foam layers 16, 18, the magnitude of the through-thickness negative Poisson's ratio can be sufficient to, for example, maintain a constant thickness of foam pad 14 or to lead to an overall increase in thickness of the foam pad 14, when stretched. For a constant thickness foam pad 14, the magnitude of the negative through thickness Poisson's ratio of auxetic foam layer 16 should be substantially similar to the magnitude of the conventional foam layer 18. If equal thicknesses of auxetic and conventional foam layers 16, 18 are employed, then the auxetic foam layers' Poisson's ratio should be equal in magnitude but opposite in sign to that of the conventional foam (e.g., conventional foam layer having Poisson's ratio: 0.2 to 0.3, and auxetic foam layer having Poisson's ratio: −0.2 to −0.3) to maintain constant thickness of foam pad 14. If the auxetic foam layer 16 has a smaller thickness than the conventional foam layer 18, then the auxetic foam will require a larger magnitude of (negative) Poisson's ratio than that of the (positive Poisson's ratio) conventional foam. Preferably, auxetic foam layer 16 has a through-thickness negative Poisson's ratio of between about 0.0 to about −1.0 and any subranges therebetween.

A negative in-plane Poisson's ratio leads to increase in the area of foam pad 14 cup on stretching. Preferably, foam pad 14 has a negative in-plane Poisson's ratio sufficient to maintain the surface area and/or shape of the foam pad upon deformation. For example, foam pad 14 can have a negative in-plane Poisson's ratio in the range of about 0.0 to about −1.0 and any subranges therebetween. Preferably, foam pad 14 has a negative in-plane Poisson's ratio of about −0.8.

In some embodiments of the present disclosure, auxetic foam layer 16 can be configured to release of one or more chemical agents (not shown) when in the open or unfolded position shown in FIG. 4. The chemical agents can include agents such as, but not limited to, deodorants, perfumes, antiperspirants, medications, and others.

It should be recognized that it is contemplated by the present disclosure for foam pad 14 to find use in support regions 12 of garment 10 other than breast cup region such as, but not limited to, a strap region 26 (FIG. 1), chest band region 28 (FIG. 1), and a side wing panel 30, any other garment region where support and shaping are desired, and any combinations thereof.

It is also contemplated by the present disclosure for foam pad 14 to find use in garments 10 other than a brassiere. For example, foam pad 14 can find use in any intimate apparel garment including a camisole, a bathing suit, a leotard, a panty, or any other garment for females or males where support and shaping are desired.

Foam pad 14 can have any shape desired for support region 12. For example, when foam pad 14 is used as a breast cup, the foam pad can have a generally hemispherical shape. In some embodiments, auxetic foam layer 16 and, when present conventional foam layer 18, are first formed as flat sheets then molded to the desired shape (i.e., a molded foam layer). In other embodiments, auxetic foam layer 16 can be cut or machined to the desired shape from a block of auxetic foam (i.e., a machined foam layer). In still other embodiments, a sheet of the auxetic foam layer 16 can be cut from a block of auxetic foam and then molded to the desired shape (i.e., a machined and molded foam layer).

Auxetic foam layer 16 having the negative in-plane Poisson's ratio can be produced by, for example, a triaxial compression and heat treatment process to produce a large isotropic auxetic foam block, from which a sheet (flat or curved) is then cut or machined.

It should also be recognized that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A garment comprising:
   a breast covering portion comprising a pair of breast cups; and
   each breast cup comprising a pad having at least one auxetic foam layer, the pad having an inner surface adjacent the breast when worn, and an outer surface.

2. The garment of claim 1, wherein said at least one auxetic foam layer comprises one or more layers of a foam selected from the group consisting of polymer auxetic foam layer, a metallic auxetic foam layer, and combinations thereof.

3. The garment of claim 1, wherein said pad further comprises at least one non-auxetic foam layer.

4. The garment of claim 3, wherein said at least one auxetic foam layer and said at least one non-auxetic foam layer are configured so that said pad maintains a constant thickness when stretched in at least one direction.

5. The garment of claim 1, wherein said pad further comprises one or more fabric layers covering at least a portion of at least one of the inner and the outer surface.

6. The garment of claim 1, wherein the garment is selected from the group consisting of a brassiere, a camisole, a bathing suit, and a leotard.

7. The garment of claim 1, wherein said at least one auxetic foam layer is configured to release a chemical agent when stretched to an open position.

8. The garment of claim 1, wherein said at least one auxetic foam layer has a negative through-thickness Poisson's ratio.

9. The garment of claim 8, wherein said negative through-thickness Poisson's ratio is in a range of about 0.0 to about −1.0.

10. The garment of claim 8, wherein said at least one auxetic foam layer has a negative in-plane Poisson's ratio.

11. The garment of claim 1, wherein said at least one auxetic foam layer has a negative in-plane Poisson's ratio.

12. The garment of claim 11, wherein said negative in-plane Poisson's ratio in a range of about 0.0 to about −1.0.

13. The garment of claim 11, wherein said at least one auxetic foam layer has a negative through-thickness Poisson's ratio.

14. The garment of claim 1, wherein said at least one auxetic foam layer comprises a molded foam layer having a desired shape.

15. The garment of claim 1, wherein said at least one auxetic foam layer comprises a machined foam layer having a desired shape.

16. The garment of claim 1, wherein said at least one auxetic foam layer comprises a machined and molded foam layer having a desired shape.

17. A brassiere, comprising:
- a pair of breast receiving cups, each of the breast receiving cups comprising a pad having at least one auxetic foam layer, the pad having an inner surface adjacent the breast when worn, and an outer surface;
- a pair of side wing panels, each side wing panel being connected to one of the breast receiving cups; and
- a pair of shoulder straps, each shoulder strap being connected to one of the breast receiving cups.

18. The brassiere of claim 17, wherein said at least one auxetic foam layer comprises one or more layers of a foam selected from the group consisting of polymer auxetic foam layer, a metallic auxetic foam layer, and combinations thereof.

19. The brassiere of claim 17, wherein said pad further comprises at least one non-auxetic foam layer.

20. The brassiere of claim 19, wherein said at least one auxetic foam layer and said at least one non-auxetic foam layer are configured so that said pad maintains a constant thickness when stretched in at least one direction.

21. The brassiere of claim 17, wherein said pad further comprises one or more fabric layers covering ay least a portion of at least one of the inner and the outer surface.

22. The brassiere of claim 17, wherein said at least one auxetic foam layer is configured to release a chemical agent when stretched to an open position.

23. The brassiere of claim 17, wherein said at least one auxetic foam layer has a negative through-thickness Poisson's ratio.

24. The brassiere of claim 23, wherein said negative through-thickness Poisson's ratio is in a range of about 0.0 to about −1.0.

25. The brassiere of claim 17, wherein said at least one auxetic foam layer has a negative in-plane Poisson's ratio.

26. The brassiere of claim 25, wherein said negative in-plane Poisson's ratio in a range of about 0.0 to about −1.0.

* * * * *